United States Patent

Pottier-Metz et al.

[11] Patent Number: 5,162,419
[45] Date of Patent: Nov. 10, 1992

[54] LOW GLOSS TALC FILLED ABS/PC

[75] Inventors: Catherine M. M. Pottier-Metz, Beauvais; Michel Erpelding, St. Maxim, both of France

[73] Assignee: GE Plastics ABS Europe B.V.

[21] Appl. No.: 685,797

[22] Filed: Apr. 16, 1991

[30] Foreign Application Priority Data

Apr. 19, 1990 [FR] France .................. 90 05020

[51] Int. Cl.$^5$ .................. C08K 3/34; C08L 69/00
[52] U.S. Cl. ........................ 524/451; 525/67
[58] Field of Search ............ 524/451; 525/67

[56] References Cited

U.S. PATENT DOCUMENTS

| | | | |
|---|---|---|---|
| 3,130,177 | 4/1964 | Grabowski | 525/67 |
| 3,988,389 | 10/1976 | Margotte et al. | 525/67 |
| 4,001,184 | 1/1977 | Scott | 528/182 |
| 4,526,926 | 7/1985 | Weber et al. | 525/67 |
| 4,855,357 | 8/1989 | Whalen et al. | 525/67 |
| 4,885,335 | 12/1989 | Gallucci et al. | 525/67 |
| 4,885,336 | 12/1989 | Boutni et al. | 525/67 |
| 4,894,416 | 1/1990 | Gallucci | 525/74 |
| 4,902,743 | 2/1990 | Boutni | 525/67 |
| 4,906,689 | 3/1990 | Boutni | 525/67 |
| 5,061,754 | 10/1991 | Dufour | 525/67 |

FOREIGN PATENT DOCUMENTS

| | | |
|---|---|---|
| 10646 | 10/1979 | European Pat. Off. . |
| 0010646 | 5/1980 | European Pat. Off. . |
| 183167 | 6/1986 | European Pat. Off. . |
| 191942 | 8/1986 | European Pat. Off. . |
| 0248308 | 12/1987 | European Pat. Off. . |
| 391413 | 10/1990 | European Pat. Off. . |
| 2259565 | 7/1964 | Fed. Rep. of Germany . |
| 3206184A1 | 9/1982 | Fed. Rep. of Germany . |
| 52-3954 | 5/1977 | Japan . |
| 57-200445 | 12/1982 | Japan . |
| 63-101456 | 5/1988 | Japan . |

*Primary Examiner*—Veronica P. Hoke
*Attorney, Agent, or Firm*—Lowe, Price, LeBlanc & Becker

[57] ABSTRACT

Objects formed by injection molding of molding compositions comprising:

(a) 10 to 80 parts by weight of at least one aromatic polycarbonate resin;
(b) 90 to 20 parts by weight of a mixture of (b1) 20-99% by weight of a graft copolymer with a rubbery graft base and (b2) 80-1% by weight of a copolymer of (b2i) styrene, alpha-methyl styrene, methyl methacrylate or a mixture thereof and (b2ii) acrylonitrile, methacrylonitrile, maleic anhydride, N-substituted maleimide or a mixture thereof and
(c) per 100 parts of (a) and (b) together 2-25 parts by weight of talc. By choosing a talc with a mean particle size between 1.5 and 20 micrometers one obtains objects with a mat surface appearance. The dullness of the surface can further be increased by using a graft copolymer with a relatively low grafting efficiency of 0.5 to 50%.

20 Claims, No Drawings

LOW GLOSS TALC FILLED ABS/PC

The present invention relates to objects formed by injection molding of a molding composition of aromatic polycarbonate resin, a mixture of a graft copolymer and a copolymer and in particular to such objects having a mat surface appearance.

Compositions of aromatic polycarbonate resins, graft copolymers like ABS and copolymers like SAN have a set of mechanical properties that render them specifically suitable for the injection molding of parts and in particular parts for the automotive industry.

However, parts formed by injection molding from these compositions have a bright surface appearance. For esthetical reasons it would be desirable to obtain objects molded from these compositions which would have a mat surface.

JP-A-52 063 954 describes a resin composition comprising 20 to 45% by weight of a diene rubber-vinyl cyanide aromatic vinyl copolymer (ABS polymerizate), 45 to 20% by weight of a polycarbonate resin and 5 to 30% by weight of talc Moldings obtained from this composition have an excellent impact resistance for thin parts. Nothing is mentioned concerning the surface appearance of the moldings. U.S. Pat. No. 4 526 926 describes mixtures of carbonate polymers and a rubber modified copolymer such as an ABS polymerizate resin having a low surface gloss Low gloss is obtained using specific ABS polymerizates having a big particle size, higher than 0.5 micrometer. The presence of ABS particles of lower size (lower than 0.5 micrometer) significantly increases the surface gloss of the resulting moldings.

EP-A-10646 describes films manufactured out of polymeric blends by means of extrusion and/or calendering. The polymeric blend comprises a polymer chosen from a whole series; to the possible polymers belong graft copolymers such as ABS. The polymeric composition further comprises a filler. The application mentions quite a lot of different fillers among which is also mentioned talc. In the examples however no polymeric compositions based on a graft copolymer with talc has been mentioned.

The preferred filler of EP-A-10646 is calcium carbonate. Experimentally it has been established that the use of calcium carbonate in compositions which are going to be used for injection molding does not result in a very low gloss. During injection molding the composition is subjected to much greater forces as compared to when subjected to extrusion and calendering. It could not be predicted that it would be possible to obtain objects formed by injection molding with a mat surface, as a consequence of the presence of talc.

It has now been discovered that it is possible to obtain moldings having a mat surface appearance from compositions comprising a polycarbonate resin, a graft copolymer polymerizate and a copolymer by addition of a specified proportion of talc of a specific particle size. In another embodiment of the present invention moldings having a mat surface appearance have been obtained from a composition of polycarbonate resin, a graft copolymer and a copolymer using specific graft copolymerizates having a grafting efficiency ranging from 0.5% to 50%. This mat surface appearance can be obtained even when using a graft copolymer such as ABS with a mean particle size below 0.5 micrometer. A further decrease of surface gloss can also be obtained for objects formed by injection molding of compositions comprising talc, by selecting the graft copolymer among the copolymers with relatively low grafting efficiency as previously mentioned.

Thus, the object of the present invention is to provide objects, made by injection molding from molding compositions comprising a polycarbonate resin, graft copolymer and a copolymer which have a mat surface appearance while maintaining good mechanical properties.

According to one embodiment of the present invention, there is provided an object formed by injection molding of a molding composition comprising:

(a) 10 to 80 parts by weight of at least one aromatic polycarbonate resin;

(b) 90 to 20 parts by weight of a mixture of (b1) 20–99% by weight of a graft copolymer with a rubbery graft base and (b2) 80-1% by weight of a copolymer of (b2i) styrene, alpha-methylstyrene, methylmethacrylate or a mixture thereof and (b2ii) acrylonitrile, methacrylonitrile, maleic anhydride, N-substituted maleimide or a mixture thereof and (c) per 100 parts of (a) and (b) together 2–25 parts by weight of talc, wherein the talc has a mean particle size between 1.5 and 20 micrometers, the mean particle size having been determined by dry sieving and being the value such that 50% by weight of the sieved talc has a bigger particle size and 50% by weight has a smaller particle size.

U.S. Pat. No. 4,098,734 describes in general terms polymeric compositions and objects formed therefrom by injection molding. The polymeric composition may comprise an aromatic polycarbonate, a graft copolymer like ABS, a copolymer like SAN and an inorganic filler. As a suitable filler talc has been mentioned. It is generally stated that for "optimum properties such as toughness, modulus and gloss of molded parts" particles of 0.05 to 30 micrometers are preferred. Talc has not been actually tested in the examples of this patent. It could not be expected that the use of talc with the particle size as defined in the main claim would result in objects not having gloss, but having dullness.

According to another embodiment of the present invention, there is provided an object formed by injection molding of a molding composition wherein the mean particle size of the talc has a value between 2.5 and 20 micrometers.

According to another embodiment of the present invention, there is provided an object formed by injection molding of a molding composition wherein the mean particle size of the talc has a value between 4.0 and 10 micrometers.

According to another embodiment of the present invention, there is provided an object formed by injection molding of a molding composition wherein the molding composition comprises 5 to 15 parts by weight of talc per 100 parts by weight of (a) and (b).

According to another embodiment of the present invention, there is provided an object formed by injection molding of a molding composition wherein the rubbery graft base of component (b1) comprises a butadiene based rubber, an EPM, an EPDM or an alkylacrylate based rubber, containing reactive sites for grafting.

According to another embodiment of the present invention, there is provided an object formed by injection molding of a molding composition wherein the graft copolymer (b1) has been obtained by grafting upon a rubbery graft base (b1i) styrene, alpha- methylstyrene, methylmethacrylate or a mixture thereof and (b1ii) acrylonitrile, methylmethacrylate or mixtures thereof.

According to still another embodiment of the present invention, there is provided an object formed by injection molding a molding composition comprising:

(a) 10 to 80 parts by weight of at least one aromatic polycarbonate resin;

(b) 90 to 20 parts by weight of a mixture of (b1) 20-99% by weight of a graft copolymer with a rubbery graft base and (b2) 80-1% by weight of a copolymer of (b2i) styrene, alpha-methylstyrene, methylmethacrylate or a mixture thereof and (b2ii) acrylonitrile, methacrylonitrile, maleic anhydride, N-substituted maleimide or a mixture thereof wherein the graft copolymer (b1) has been obtained by grafting upon a rubbery graft base (b1i) styrene, alpha- methylstyrene, methylmethacrylate or a mixture thereof and (b1ii) acrylonitrile, methylmethacrylate or mixtures thereof.

It is possible to use graft copolymers comprising besides the above mentioned grafting monomers (b1i) and (b1ii) further grafting monomers such as maleic anhydride and N-substituted maleimides.

According to still another embodiment of the present invention, there is provided an object formed by injection molding a molding composition wherein the grafting efficiency varies between 15 and 45%.

The composition according to the present invention may further include usual additives such as lubricants, antioxidants, fillers, pigments and dyes, UV absorbers and flame retardants.

Useful aromatic polycarbonate resins include polymers derived from a divalent phenol and a carbonate precursor, for example phosgene, haloformate or a carbonate ester.

Preferably, the aromatic polycarbonate resins have an intrinsic viscosity of about 0,35 to 0,75 (measured in p-dioxane at 30° C. in dl/g). Among the suitable divalent phenols useful for making these aromatic polycarbonate resins are mononuclear and polynuclear aromatic compounds which include two hydroxyl groups as functional groups which are both directly linked to a carbon atom of an aromatic ring. Examples of suitable divalent phenols are : 2,2-bis(4-hydroxy phenyl)propane (bisphenol-A=BPA); resorcinol, bis(4-hydroxy-5-nitro phenyl) methane; 2,2'-dihydroxy bisphenyl; 2,6-dihydroxy naphthalene; bis(4-hydroxy-phenyl) sulfone; 5'-chloro-2,4'-dihydroxy diphenyl sulfone; 4,4'-dihydroxy diphenylether and 4,4'-dihydroxy-2,5 diethoxy diphenylether.

For the preparation of the aromatic polycarbonate resins it is possible to use two or more different divalent phenols or a copolymer of a divalent phenol with a glycol or a polyester having an acid or hydroxyl terminating group. Aromatic polycarbonate resin may also be prepared in the presence of an aromatic or aliphatic dibasic acid. It is also possible to use cross-linked polycarbonate resins such as those described in U.S. Pat. No. 4,001,184. It is also possible to use a mixture of two or more of the above mentioned polycarbonate resins.

Graft copolymers useful in the present invention are well known in the art; they can be blended with nitrile-butadiene, styrene-butadiene, styrene-butadiene-styrene elastomers and with other elastomers such as EPM, EPDM and alkylacrylates.

Suitable graft copolymers are for example ABS polymers. Such graft copolymers as well as their method of preparation are well known in the art and are described among others in EP-A-0 248 308, DE-A-2259 565 and U.S. Pat. No. 3,130,177.

ABS polymerizates are polymerizates in which are graft polymerized on a rubber either a styrene, methyl methacrylate monomer or a mixture of 95-50 weight percent of styrene, alpha-methylstyrene, methylmethacrylate monomers and 5-50 weight percent of acrylonitrile, methylmethacrylate, or mixtures thereof, possibly in combination with maleic anhydride or N-substituted maleimides. Useful rubbers are in particular polybutadiene, butadiene/styrene copolymerizates with up to 30% by weight of polymerized styrene, butadiene and acrylonitrile copolymerizates or butadiene copolymerizates with up to 20% by weight of a lower alkyl ester of acrylic or methacrylic acid (for example methyl acrylate, ethyl acrylate, methyl methacrylate and ethyl methacrylate).

ABS graft polymerizates comprise 5 to 80% by weight, preferably 20 to 70% by weight of rubber and 95 to 20% by weight, preferably 80 to 30% by weight of graft polymerized monomers.

Especially preferred are ABS polymerizates obtained by graft polymerization of polybutadiene with styrene and acrylonitrile monomers.

More specifically, in these preferred ABS polymerizates the sum of styrene monomers plus acrylonitrile monomers introduced during grafting of polybutadiene ranges from 30 to 70% by weight with a styrene/ acrylonitrile ratio varying from 3/1 to 3/2, combined with 70 to 30% by weight of polybutadiene.

Preferred ABS polymerizates have a grafting efficiency of polybutadiene ranging generally from 0.5 to 95%. Grafting efficiency is defined as the ratio of the amount of grafted monomers to the total amount of grafted plus copolymerised monomers during the grafting reaction on the rubber. It is measured by first extracting the ABS with hexane (8 hours at 69° C.) followed by acetone extraction (15 hours at 56° C.) of the portion insoluble in hexane. The hexane insoluble portion comprises the crosslinked butadiene, styrene and acrylonitrile grafted on the butadiene and copolymerised styrene and acrylonitrile. The acetone extract comprises the copolymerised styrene and acrylonitrile, whereas the other components are insoluble in acetone. It is particularly preferred using ABS polymerizates having a high rubber content, 30 to 80 weight percent and a relatively low grafting efficiency, 50% or lower, generally ranging from 0.5 to 50% or lower than 50%. Although ABS polymerizates having a grafting efficiency less than 0.5% would still be advantageous with regard to lowering gloss, a grafting efficiency less than 0.5% results in a decrease of mechanical properties, in particular the impact resistance.

Particularly preferred are such ABS polymerizates having a grafting efficiency ranging from 15 to 45%. The particle size of the ABS polymerizates is not essential for obtaining the low gloss surface and ABS polymerizates having an average particle size lower than 0.5 μm, for example 0.3 μm, can be used.

It is possible to use other rubbers for the preparation of the graft copolymer such as EPM, EPDM and alkylacrylate based rubbers.

Copolymers and their methods of preparation are well known in the art and are described, among others, in EP-A-0 248 308.

Copolymers useful in the present invention are copolymerizates of 95 to 40 parts by weight of styrene, alpha-methylstyrene, methyl methacrylate and mixtures thereof and 5 to 60 parts by weight of acrylonitrile, methacrylonitrile, methyl methacrylate, maleic anhydride and N-substituted maleimides and mixture thereof. More particularly, the preferred copolymers are styrene/acrylonitrile copolymers having a ratio of styrene units to acrylonitrile units of 90/10 to 40/60 and preferably of 80/20 to 60/40 and a weight average molecular weight of 50,000 to 180,000 as determined by gel permeation chromatography.

Talc, when used, may be any talc commercially available having a mean particle size ranging from 0.5 micrometer to 20 micrometesr. Preferably, the talc will have an average particle size between 2.5 and 20 micrometers or between 4,0 and 10 micrometers. Talc, when used, comprises, per 100 parts by weight of components a) and b), 2 to 25 parts by weight. Still more preferably 5 to 15 parts by weight of talc are used per 100 parts by weight of components a) and b).

Mean particle size is defined as follows: it is the corresponding size of the meshes in a sieve through which 50% by weight of the particles (dry) pass and 50% by weight are withheld. In this way the structure of the talc particles, usually lamellar, is not taken into account.

The compositions of the present invention include 10 to 80 parts by weight of polycarbonate resins and correspondingly 90 to 20 parts by weight of a mixture of graft copolymer and copolymer. Preferably, the compositions of the present invention include 20 to 70% by weight of polycarbonate resin and 80 to 30% by weight of ABS polymer and SAN copolymer.

The amount of graft copolymer such as ABS in the mixture b) of the molding composition varies from 20 to 95% by weight, preferably, from 30 to 65% by weight.

Optionally, the compositions may also include some known and widely used additives such as lubricants, in particular those described in FR-A-89 169 22, inert and reinforcing fillers, such as glass, mica, clay and glass fibres; UV absorbers, such as benzophenones and benzotriazoles; flame retardants and antioxidants such as phenols, phosphites and their mixtures.

In the following examples, unless otherwise indicated, all percentages and parts are per weight.

Vicat temperature (ISO R 306), Izod (ISO R 180) impact strengths have been measured according to standard test procedures.

Melt flow rate (MFR; 220° C./10 kg) test has been performed according to ISO R1133.

Flexion modulus has been determined according to ISO R-178.

Specular gloss measurements at 60° was made as follows:

The compositions were moulded into tensile test bars by injection under pressure (ASTM-D 638).

The test bars are initially molded by injection under pressure to a filling value of 99%, which corresponds to the so-called "SSP" pressure (short shot point), at a temperature of 280° C. and at a mold temperature of 50° C. Pressure is thereafter increased by 1 MPa (10 bar), test bars being fully filled. Maximum injection speed was also used. For each condition set the gloss value at 60° has been reported. The gloss has been measured with a gloss meter GARDNER micro TRI gloss under a measurement angle of 60°. This is a very severe test, usually resulting in an increase of gloss as compared to other processes of manufacture like extrusion and calendering. The described injected molding conditions are also less suitable for obtaining the lowest possible gloss.

COMPARATIVE EXAMPLE A AND EXAMPLES 1 TO 3

These examples show the effect of the talc addition and of the grafting efficiency of the ABS polymerizate on the gloss of the resulting moldings.

Compositions of examples A and 1 to 3 have been prepared by blending the components shown in table 1 in the indicated proportions. Components were premixed together in a high speed mixer and then mixed in a double screw extruder at 250° C. The compositions were then molded as indicated above. Gloss results are shown in table 2.

TABLE 1

|  | Example A | Example 1 | Example 2 | Example 3 |
|---|---|---|---|---|
| Polycarbonate[1] | 45 | 45 | 45 | 45 |
| ABS Polymerizate[2] | 25* | 25** | 25* | 25** |
| SAN Copolymer[3] | 30 | 30 | 30 | 30 |
| Talc[4] | — | — | 10 | 10 |

[1] Bisphenol A polycarbonate Mw (g/mol) 21.000
[2] Grafted polymerizate of acrylonitrile - butadiene - styrene comprising 50% of polybutadiene, 38% of styrene, 12% of acrylonitrile; mean particle size 250-290 micrometer (narrow and regular distribution)
[3] Styrene-acrylonitrile copolymer comprising 28% acrylonitrile, Mw = 100,000 (g/mol)
[4] Talc, average particle size 4.5 micrometer
*Grafting efficiency 53%
**Grafting efficiency 39%

TABLE 2

|  | Gloss 60° (%) SSP + 1 MPa |
|---|---|
| Example A | 88 |
| Example 1 | 56 |
| Example 2 | 36 |
| Example 3 | 27 |

Results clearly show the decrease of surface gloss when adding talc for use in the ABS polymerizate composition.

It can also be seen that a better result is steel obtained when talc and an ABS polymerizate of low grafting ratio are used simultaneously.

Comparative Example B and Examples 4 to 11

Compositions of Table 3 have been prepared as above. The mechanical properties and the glass have been determined on test bars molded from these compositions. The results appear in table 4.

TABLE 3

|  | B | 4 | 5 | 6 | 7 | 8 | 9 | 10 | 11 |
|---|---|---|---|---|---|---|---|---|---|
| Polycarbonate[1] | 45 | 45 | 45 | 45 | 45 | 45 | 45 | 24 | 29 |
| ABS polymerizate[2] | 25 | 25 | 25 | 25 | 25 | 25 | 25 | 41 | 30 |
| SAN Copolymer[3] | 30 | 30 | 30 | 30 | 30 | 30 | 30 | 35 | 41 |
| Talc | — | 3[4] | 5[4] | 7.5[4] | 10[4] | 7.5[5] | 7.5[6] | 7.5[4] | 6[4] |
| Carbon black | 1 | 1 | 1 | 1 | 1 | 1 | 1 | 1 | 1 |
| Thermal stabilizers | 0.25 | 0.25 | 0.25 | 0.25 | 0.25 | 0.25 | 0.25 | 0.25 | 0.25 |

TABLE 3-continued

|  | B | 4 | 5 | 6 | 7 | 8 | 9 | 10 | 11 |
|---|---|---|---|---|---|---|---|---|---|
| Lubricants | 0.3 | 0.3 | 0.3 | 0.3 | 0.3 | 0.3 | 0.3 | 0.3 | 0.3 |

[1] Bisphenol A polycarbonate - Mw (g/mol) 21,000
[2] Grafted polymerizate of acrylonitrile-butadiene-styrene comprising 50% of polybutadiene, 38% of styrene, 12% of acrylonitrile. Grafting efficiency 39%; mean particle size 250-290 micrometers; narrow and regular distribution
[3] Styrene-acrylonitrile copolymer comprising 28% acrylonitrile, Mw = 100 000 (g/mol)
[4] Talc average particle size 4.5 μm
[5] Talc average particle size 2.5 μm
[6] Talc average particle size 1.8 μm.

TABLE 4

|  | B | 4 | 5 | 6 | 7 | 8 | 9 | 10 | 11 |
|---|---|---|---|---|---|---|---|---|---|
| MFR 220° C./10 kg (g/min) | 7.3 | 9.2 | 7.6 | 8.2 | 6.9 | 8.4 | 7.2 | 5.4 | 10.4 |
| Izod (J/m) | | | | | | | | | |
| 23° C. | 520 | 418 | 340 | 274 | 230 | 305 | 320 | 230 | 163 |
| −30° C. | 232 | 124 | 109 | 87 | 65 | 94 | 75 | 87 | 68 |
| Flexion modulus (GPa) | 2.13 | 2.3 | 2.4 | 2.56 | 2.8 | 2.69 | 2.7 | 2.13 | 2.43 |
| Vicat 5 kg/B120 | 113.5 | 114.5 | 115 | 116 | 116.5 | 115 | 116 | 105 | 108 |
| Gloss 60° (%) SSP + 1 MPa | 60 | 46 | 38 | 29 | 27 | 32 | 36 | 26 | 26 |

The decrease in gloss is immediately recognizable and is obtained with only an acceptable lowering of the impact resistance of the moulded compositions. The low glass level obtained is as much better as the average particle size of talc is greater.

Comparative Example C and Examples 12 to 17

These examples show the effect of the talc proportions on the surface gloss of the molding.

Compositions of comparative example C and of examples 12 to 17 have been prepared by mixing as previously the ingredients shown in table 5 in the indicated proportions, but at a temperature of 280° C. Mechanical properties and surface gloss of these molded compositions are shown in table 5.

TABLE 5

|  | C | 12 | 13 | 14 | 15 | 16 | 17 |
|---|---|---|---|---|---|---|---|
| Polycarbonate[9] | 57 | 57 | 57 | 57 | 57 | 57 | 57 |
| ABS Polymerizate[10] | 18 | 18 | 18 | 18 | 18 | 18 | 18 |
| SAN Copolymer[11] | 25 | 25 | 25 | 25 | 25 | 25 | 25 |
| Talc | — | 5[4] | 10[4] | 15[4] | 5[6] | 10[6] | 15[6] |
| Izod (J/m) | | | | | | | |
| 23° C. | 570 | 610 | 560 | 450 | 510 | 460 | 310 |
| 0° C. | 450 | 540 | 440 | 270 | 410 | 290 | 180 |
| −20° C. | 360 | 450 | 190 | 92 | 240 | 150 | 92 |
| Vicat 5 kg/B120 | 129 | 129 | 128 | 131 | 129 | 129 | 130 |
| Gloss 60° (%) SSP + 1 MPa | 90 | 53 | 22 | 20 | 37 | 33 | 22 |

[4],[6] See table 3
[9] Bisphenol A polycarbonate Mw (g/mol) 26,500.
[10] Grafted polymerizate of acrylonitrile-butadiene-styrene comprising 50% polybutadiene, 35% styrene, 15% acrylonitrile. Grafting efficiency 60%; mean particle size 200-300 micrometers; broad and irregular distribution.
[11] Styrene-acrylonitrile copolymer comprising 28% acrylonitrile, Mw = 120,000 (g/mol).

In the above examples talc greatly improves the surface appearance of the moldings, as measured by glass (%). Best results are obtained for talc amounts of 10 to 15 weight percent.

We claim:

1. A method of reducing the glass of a molding composition of (a) 10 to 80 parts by weight of at least one aromatic polycarbonate resin; and (b) 90 to 20 parts by weight of a mixture of (b1) 20–99% by weight of a graft copolymer having a rubbery graft base and (b2) 80-1% by weight of a copolymer of (b2i) styrene, alpha-methylstyrene, methyl methacrylate or a mixture thereof and (b2ii) acrylontirile, methacryonitrile, maleic anhydride, N-substituted maleimide or a mixture thereof, comprising adding (c) 2 to 25 parts by weight of talc per 100 parts by weight of (a) and (b), the talc having a mean particle size between 1.5 and 20 micrometers, the mean particle size having been determined by dry sieving and being the value such that 50% by weight of the sieved talc has a bigger particle size and 50% by weight has a smaller particle size.

2. The method of claim 1, wherein the mean particle size of the talc is between 2.5 and 20 micrometers.

3. The method of claim 1, wherein the mean particle size of the talc is between 4.0 and 10 micrometers.

4. The method of claim 1, wherein 5 to 15 parts by weight of talc is added to (a) and (b) per 100 parts by weight of (a) and (b).

5. The method of claim 1, wherein the rubbery graft base of component (b1) comprises a butadiene rubber, an ethylene propylene copolymeric an ethylene propylene diene copolymer or an alkylacrylate based rubber, containing reactive sites for grafting.

6. The method of claim 1, wherein the graft copolymer (b1) is obtained by grafting upon a rubbery graft base (b1i) styrene, alpha-methylstyrene, methylmethacrylate or a mixture thereof and (b1ii) acrylonitrile, methylmethacrylate, maleic anhydride, N-substituted maleimides or mixtures thereof.

7. The method of claim 1, further comprising blending a mixture of (a), (b) and (c) and molding the mixture into an article having a mat surface appearance.

8. A method of reducing the gloss of a molding composition of (a) 10 to 80 parts by weight of at least one aromatic polycarbonate resin; and (b) 90 to 20 parts by weight of a mixture of (b1) 20–99% by weight of graft copolymer having a rubber graft base and (b2) 80-1% by weight of a copolymer of (b2i) styrene, alpha-methyl styrene, methyl methacrylate or a mixture thereof and (b2ii) acrylonitrile, methacrylonitrile, maleic anhydride, N-substituted maleimide or a mixture thereof, comprising, using a graft copolymer (b1) obtained by grafting upon a rubbery graft base (b1i) styrene, alpha-methylstyrene, methyl methacrylate or a mixture thereof and (b1ii) acrylonitrile, methyl methacrylate or mixtures thereof, wherein the relative quantity of grafted monomers (b1i) and (b1ii) to grafted plus copolymerized but not grafted monomers (b1i) and (b1ii) in the graft copolymer has a value between 0.5% and 50%.

9. The method of claim 8, wherein the relative quantity of grafted monomers to grafted plus copolymerized monomers in the graft copolymers has a value between 15% and 45%.

10. The method of claim 8, wherein the mean particle size of the graft copolymer is less than 0.5 micrometer.

11. The method of claim 8, further comprising blending a mixture of (a) and (b) and molding the mixture into an article having a mat surface appearance.

12. An injection molded article formed of a molding composition comprising:
(a) 10 to 80 parts by weight of at least one aromatic polycarbonate resin;
(b) 90 to 20 parts by weight of a mixture of (b1) 20-99% by weight of a graft copolymer having a rubbery graft base and (b2) 80-1% by weight of a copolymer if (b2i) styrene, alpha-methylstyrene, methyl methacrylate or a mixture thereof, and (b2ii) acylonitrile, methacrylonitrile, maleic anhydride, N-substituted maleimide or a mixture thereof, and
(c) per 100 parts of (a) and (b) combined, 2-25 parts by weight of talc having a mean particle size between 1.5 and 20 micrometers, the man particle size being determined by dry sieving and being the value such that 50% by weight of the sieved talc has a bigger particle size and 50% by weight of the sieved talc has a smaller particle size.

13. An injection molded article according to claim 12, wherein the mean particle size of the talc is between 2.5 and 20 micrometers.

14. An injection molded article according to claim 12, wherein the mean particle size of the talc is between 4.0 and 10 micrometers.

15. An injection molded article according to claim 12, wherein the molding composition comprises 5 to 15 parts by weight of talc per 100 parts by weight of (a) and (b).

16. An injection molded particle according to claim 12, herein the rubbery graft base of component (b1) comprises a butadiene rubber, an ethylene propylene, an ethylene propylene diene or an alkylacrylate based rubber, containing reactive sites for grafting.

17. An injection molded article according to claim 12, wherein the graft copolymer (b1) has been obtained by grafting upon a rubbery graft base (b1i) styrene, alpha-methylstyrene, methyl methacrylate or a mixture thereof and (b1ii) acrylonitrile, methyl methacrylate, maleic anhydride, N-substituted maleimides or mixtures thereof.

18. An injection molded article formed from a molding composition comprising:
(a) 10 to 80 parts by weight of at least one aromatic polycarbonate resin;
(b) 90 to 20 parts by weight of a mixture of (b1) 20-99% by weight of a graft copolymer having a rubbery graft base and (b2) 80-1% by weight of a copolymer of (b2i) styrene, alpha-methyl styrene, methyl methacrylate or a mixture thereof and (b2ii) acrylonitrile, methacrylonitrile, maleic anhydride, N-substituted maleimide or a mixture thereof, wherein the graft copolymer (b1) has been obtained by grafting upon a rubbery graft base (b1i) styrene, alpha-methylstyrene, methyl methacrylate or a mixture thereof, and (b1ii) acrylonitrile, methyl methacrylate or mixtures thereof, and further wherein the relative quantity of grafted monomers (b1i) and (b1ii) to grafted monomers (b1i) and b1ii) and copolymerized but not grafted monomers (b1i) and (b1ii) in the graft copolymer, defined as the grafting efficiency, is between 0.5 and 50%.

19. An injection molded article according to claim 18, wherein the grafting efficiency is between 15 and 45%.

20. An injection molded article according to claim 12, wherein the mean particle size of the graft copolymer is below 0.5 micrometer.

* * * * *